United States Patent
Majmundar et al.

(10) Patent No.: US 10,257,105 B2
(45) Date of Patent: Apr. 9, 2019

(54) FACILITATION OF PHYSICAL LAYER DESIGN FOR 5G NETWORKS OR OTHER NEXT GENERATION NETWORKS

(71) Applicant: AT&T Intellectual Property I, L.P., Atlanta, GA (US)

(72) Inventors: Milap Majmundar, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 65 days.

(21) Appl. No.: 15/368,146

(22) Filed: Dec. 2, 2016

(65) Prior Publication Data

US 2018/0159611 A1 Jun. 7, 2018

(51) Int. Cl.
| | |
|---|---|
| H04L 12/811 | (2013.01) |
| H04L 12/715 | (2013.01) |
| H04L 12/717 | (2013.01) |
| H04W 84/04 | (2009.01) |
| H04B 7/0413 | (2017.01) |

(52) U.S. Cl.
CPC .............. *H04L 47/38* (2013.01); *H04L 45/42* (2013.01); *H04L 45/64* (2013.01); *H04B 7/0413* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 6,278,726 B1* | 8/2001 | Mesecher | H04B 1/7097 370/342 |
| 8,462,737 B1 | 6/2013 | Gage | |
| 8,649,341 B2 | 2/2014 | Guey et al. | |
| 9,112,758 B2 | 8/2015 | Niu et al. | |
| 9,295,065 B2 | 3/2016 | Dahod et al. | |
| 9,419,757 B2 | 8/2016 | Chen | |
| 2008/0130769 A1* | 6/2008 | Papadopoulos | H04B 7/022 375/260 |
| 2012/0213111 A1* | 8/2012 | Shimezawa | H04B 7/063 370/252 |
| 2013/0083768 A1* | 4/2013 | Liu | H04L 27/2636 370/330 |
| 2016/0014726 A1 | 1/2016 | Abrishamkar et al. | |

(Continued)

OTHER PUBLICATIONS

Peng et al., "Fronthaul-Constrained Cloud Radio Access Networks: Insights and Challenges," IEEE Wireless Communications, Apr. 2015, pp. 152-160, IEEE, 9 pages.

(Continued)

*Primary Examiner* — Noel R Beharry
*Assistant Examiner* — Ruihua Zhang
(74) *Attorney, Agent, or Firm* — Amin, Turocy & Watson, LLP

(57) ABSTRACT

A more efficient 5G network can be achieved by leveraging a centralized radio access network (CRAN) and/or a virtualized radio access network (VRAN) architecture to comply with transport bandwidth requirements for better performance. Additionally, linear compression techniques can be used to reduce the transport bandwidth. Compression on a fronthaul can be achieved by utilizing the concept of spatial compression. After a signal has been compressed, it can be decompressed in accordance with a number of antennas.

20 Claims, 12 Drawing Sheets

(56) References Cited

U.S. PATENT DOCUMENTS

| | | |
|---|---|---|
| 2016/0100373 A1* | 4/2016 | Chen .................. H04L 27/2613 |
| | | 370/350 |
| 2016/0128085 A1 | 5/2016 | Liu et al. |
| 2016/0156503 A1 | 6/2016 | Rosa de Sousa Teixeira et al. |
| 2016/0183248 A1 | 6/2016 | Niu et al. |
| 2016/0212747 A1 | 7/2016 | Effenberger et al. |
| 2016/0226538 A1* | 8/2016 | Kim ...................... H04B 1/123 |
| 2016/0234819 A1 | 8/2016 | da Silva et al. |
| 2016/0242147 A1 | 8/2016 | Tarlazzi et al. |
| 2017/0134210 A1* | 5/2017 | Eitan .................... H04L 27/367 |

OTHER PUBLICATIONS

Simeone et al., "Cloud Radio Access Network: Virtualizing Wireless Access for Dense Heterogeneous Systems," Dec. 2015, 22 pages.

* cited by examiner

FACILITATION OF PHYSICAL LAYER DESIGN FOR 5G NETWORKS OR OTHER NEXT GENERATION NETWORKS

TECHNICAL FIELD

This disclosure relates generally to facilitating a physical layer design for 5G networks or other next generation networks. For example, this disclosure relates to facilitating a cloud radio access network layer design for multiple-input and multiple-output 5G radio access networks.

BACKGROUND

5th generation (5G) wireless systems represent the next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to a physical layer design is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
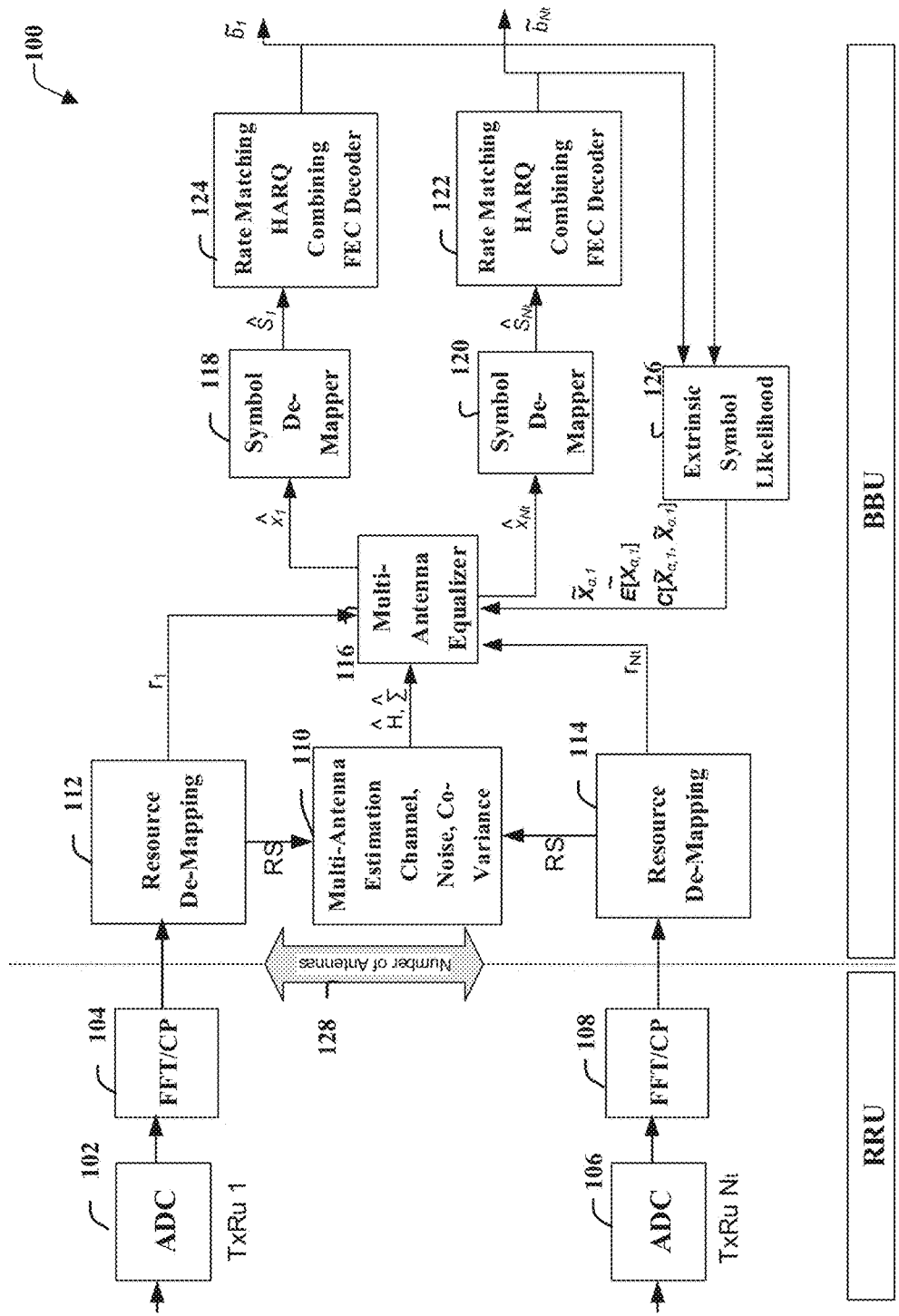
FIG. 1 illustrates an example schematic system block diagram of a physical layer model for centralized radio access network according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a physical layer design for 5G networks or other next generation networks.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a physical layer design for a 5G network. Facilitating a physical layer design for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)).

Cloud radio access networks (RAN) can enable the implementation of concepts such as software defined network (SDN) and network function virtualization (NFV) in 5G networks. This disclosure can facilitate implementation of 5G radio access network (RAN) based on a centralized/virtualized RAN architecture. 5G radio access networks are expected to be deployed with massive multiple-input and multiple-output (MIMO) antenna systems using a large number of antennas. This disclosure enables the implementation of 5G networks using a centralized radio access network (CRAN) and/or a virtualized radio access network (VRAN) architecture by keeping transport bandwidth requirements reasonable, not precluding or limiting support for advanced 5G receivers, and allowing use of coordination techniques, such as joint processing, for better performance. Although it is very difficult to achieve this combination of attributes simultaneously in a network deployment, this combination of attributes can increase efficiencies for a wireless network operator.

Deploying a CRAN architecture for a 5G network with a large number of antennas can place heightened bandwidth requirements on the transport interface connecting the remote unit (RU) and centralized unit (CU). A CRAN architecture typically splits the RAN protocol stack at a functional split point such that the protocol layers below the split point reside at the remote unit while the protocol layers above the split point reside at the centralized unit. Protocol layers that reside at the centralized unit can be virtualized in a pooled architecture, thereby enabling benefits related to a software defined network (SDN) and/or network function virtualization (NFV) based network architecture. Therefore, certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

It can be beneficial to split the protocol as low in the protocol stack as possible. Additionally, when the RAN protocol stack is split at a low physical layer interface, it can allow benefits from coordination techniques such as joint transmission or a joint reception. However, for 5G radio networks comprising a large number of antennas, splitting the protocol stack deep inside the physical layer can require carrying the data stream from a large number of antennas at the remote unit to the centralized unit over a high bandwidth transport link, which can make such a CRAN architecture infeasible for 5G radio networks. This disclosure proposes a specific linear compression technique to be implemented within the physical layer protocol functions that allows the physical layer to be split at a point that significantly reduces the number of data streams that need to be transported over the transport link from the remote unit to the central unit. Consequently, this does not preclude any type of advanced receiver implementation and this set up can support joint processing based coordination techniques.

A lower layer split within the physical (PHY) layer can give rise to other issues. However, a mid-PHY split can satisfy the following scenarios: 1) it should not preclude the implementation of advanced receivers; 2) it should maintain the ability to perform joint processing (both joint reception and joint transmission) across multiple transmission points; and 3) it should keep transport bandwidth requirements reasonable. While LTE receivers have typically been single stage receivers, more advanced receivers (e.g., turbo equalizers) can become the model for a new radio (NR). This is due to advances in computational power and also because many physical layer design aspects for NR (NR is used herein to refer to the next generation radio interface for 5G) are different from LTE. Some of the main considerations are: higher order MIMO in uplinks (UL), cyclic prefix (CP) less design of waveform, and high frequency bands. For NR there may be a need to decode multiple spatial layers in the UL when using multi-user (MU) MIMO. As the number of MIMO streams increase, the benefits of advanced receivers can become more significant due to an increase in inter-stream interference. Additionally, if phase 2 of NR evolves to a CP less design of the waveform, then in addition to experiencing inter-stream interference, the NR signal can experience inter-symbol interference as well, thereby benefiting further from such advanced receivers. For NR deployment in high frequency bands, advanced iterative receivers can assist with the UL link budget and also have positive implications on the power consumption at the user equipment (UE).

Due to the aforementioned reasons, a PHY layer split option should not preclude or limit the deployment of any type of advanced receivers for NR. Furthermore, it can be difficult to achieve a common PHY layer split option between the uplink and downlink that simultaneously satisfies all three scenarios listed above. Consequently, a PHY split option can be asymmetric in the downlink and uplink. For the uplink PHY processing, the equalization and forward error correction (FEC) decoding can be at the CU to allow for more advanced receivers such as turbo equalization or successive interface cancellation (SIC), thereby satisfying the first scenario listed above. Also keeping the antenna processing at the CU allows for joint reception (JR) across multiple transmission points, thereby satisfying the second listed requirement as well. However, the problem is that the number of layers that need to be transported between the CU and RU becomes equal to the number of transceivers (since equalization is being done at the CU). It may be observed that even though the number of layers may be large, the signals may be highly correlated since the number of PHY spatial layers (Ns) can be less than the number of transceivers (Nt). This observation leads to the possibility of using linear compression techniques to reduce the transport bandwidth scenario on this interface, thereby satisfying the third listed scenario for the uplink PHY split as well.

Compression on the fronthaul can be achieved by utilizing the concept of spatial compression. As discussed previously, before the multi-antenna stage, the number of streams on the fronthaul can be equal to the number of antenna transceiver units (txRU), which in massive MIMO systems for 5G, can be as high as 32 or 64. However the signals from each antenna can be highly correlated due to the fact that the underlying signals can comprise a small number of spatial layers (typically 2-4). Spatial correlation can then be utilized to collapse the multi-antenna signal into a smaller dimensional signal space. For instance, the signal can be collapsed to a dimension equal to the number of layers (e.g., 2-4).

On the centralized baseband unit (BBU) side, the signal can be decompressed back into the full dimension equal to the number of antennas. Consequently, noise may be introduced into the system due to the compression and de-compression (especially if the number of bits to quantize each stream is small), but this can be mitigated by implementing additional advanced multi-antenna receivers at the BBU.

One example of such a linear spatial compression technique is based on MMSE spatial filter. Therefore, if the received signal going into the spatial compression stage is given by, $$r=Hs+n: \text{ where } r=[r_1 \ldots r_N]^T, n=[n_1 \ldots n_N]^T, s=[s_1 \ldots s_L]^T \quad \text{Equation (1)}$$

(in the above equation, r is the received signal, n is the noise, s is the transmitted signal and H is the multi-antenna channel) then the optimal MMSE spatial compression filter can be shown as:

$$G=(H^H H+\Sigma)^{-1}H^H \quad \text{Equation (2)}$$

$$\Sigma=E\{nn^H\} \quad \text{Equation (3)}$$

The compressed signal sent over the fronthaul in this case is $$r'=Gr=(H^H H+\Sigma)^{-1}H^H(Hs+n) \quad \text{Equation (4)}$$

The dimensionality of the r' can be the same as the dimensionality of s, (e.g., the number of spatial layers of the signal). Once the compressed signal is received at the BBU, the signal can be decompressed to the full dimension of the number of antennas. If the link between the RRU and BBU does not introduce any noise (as is the case with a fiber based fronthaul with sufficient number of bits to eliminate quantization noise), then a Penrose-Moore inverse of MMSE spatial filter can be used for the decompression stage.

$$G_{inv}=(G^H G)^{-1}G^H$$

On the other hand if only a few bits are chosen for each sample to further reduce the fronthaul bandwidth, then the de-compression filter can be given by:

$$G_{inv}=(G^H G+\sigma^2 I(L,L))^{-1}G^H \quad \text{Equation (5)}$$

In the above expression for the decompression filter, $\sigma^2$ is the standard deviation of the quantization noise injected due to low resolution of the fronthaul. In both the cases, in order to the compute the optimum de-compression filter at the BBU, the remote radio unit (RRU) needs to send the filter coefficient of G to the BBU along with the compressed data. Thus, the full dimension signal can be re-constructed in the BBU as:

$$\tilde{r}=G_{inv}r'\approx r, \text{ where the reconstructed signal } \tilde{r} \text{ can be copy of the original signal } r. \quad \text{Equation (6)}$$

The spatial compression technique can reduce the fronthaul bandwidth for massive MIMO systems by 10× or more. The spatial compression technique can depend on the correlation in the received signal due to the spatial sampling of the signal, which comes naturally in the massive MIMO system. Any other correlations such a temporal or spectral is not utilized therefore this technique does not need to know any properties of the original transmitted signal.

In one embodiment, described herein is a method comprising converting, by a wireless network device of a wireless network, time signal data of the wireless network to frequency signal data, resulting in time-frequency data representative of a time-frequency data structure. The method also comprises separating, by the wireless network device, a physical channel and a reference signal from the time-frequency data structure, resulting in a number of separated physical layers. In response to the separating, the method can estimate, by the wireless network device, channel response characteristics and antenna characteristics of the wireless network; and based on the channel response characteristics and the antenna characteristics, the method can compress, by the wireless network device, the number of the separated physical layers, resulting in a reduced number of the separated physical layers.

According to another embodiment, a system can facilitate, the converting time signal data of the wireless network to frequency signal data, resulting in time-frequency data representative of a time-frequency data structure. The system can facilitate separating a physical channel from the time-frequency data structure, resulting in a number of separated physical layers. Additionally, based on the separating, the system can estimate a channel response characteristic and an antenna characteristic of the wireless network. Consequently, in response to the estimating, the system can compress the number of the separated physical layers, resulting in a reduced number of the separated physical layers, and in response to the compressing, the system can decompress the reduced number of the separated physical layers.

According to yet another embodiment, described herein is a machine-readable storage medium that can perform the operations comprising transforming time signal data representative of a time signal of a wireless network to frequency signal data representative of a frequency signal of the wireless network, resulting in time-frequency data. The machine-readable storage medium can extract physical channel data representative of a physical channel from the time-frequency data, resulting in a number of separated physical layers. Based on the extracting, the machine-readable storage medium can estimate a channel response characteristic and an antenna characteristic of the wireless network. Consequently, the machine-readable medium can compress the number of the separated physical layers, resulting in a reduced number of the separated physical layers, and generate filter weight data representative of a filter weight associated with the compressing. In response to the generating, the machine-readable storage medium can decompress the reduced number of the separated physical layers.

These and other embodiments or implementations are described in more detail below with reference to the drawings.

Referring now to FIG. 1, illustrated is a physical layer model for centralized radio access network. The amount of bandwidth needed to connect the centralized baseband unit (BBU) and the remote radio unit (RRU) can increase linearly with the number of antenna ports and the system bandwidth based on the C-RAN architecture of system 100. Analog to digital conversion components 102, 106 can convert one or more received analog signals to digital signals prior to sending the converted digital signal(s) to a fast Fourier transform component 104, 108 to convert a time domain signal to frequency domain signal(s) at the RRU. Thereafter, the frequency domain signals can be transmitted over a number of antennas 128 to a resource de-mapping component 112, 114 prior to being transmitted to a multi-antenna estimation component 110.

The BBU can comprise the resource de-mapping components 112, 114, which can separate various physical channels and reference signals from the time-frequency grid of resource equipment. The multi-antenna estimation component 110 can estimate a MIMO channel response as well as the noise plus interference co-variance needed for equalization de-mapping. The signals can then be passed to a multi-antenna equalizer component 116. The multi-antenna equalizer component 116 can separate the various MIMO layers from the received signal across all the transceivers. This step could be a linear receiver such as minimum mean square error improved interference rejection combining (MMSE-IRC) or a non-linear receiver such as maximum likelihood receiver (ML). The multi-antenna equalizer component 116 can also receive inputs from an extrinsic symbol likelihood component 126. Depending on the type of iterative equalizer, the extrinsic symbol likelihood component 126 can computes extrinsic values (e.g. for SIC receiver the extrinsic symbol likelihood component 126 can compute the soft symbol or for turbo equalizer the extrinsic symbol likelihood component 126 can computes statistical parameters such as expectation and signal covariance. Output signals from the multi-antenna component 116 can be received by symbol de-mappers 118, 120. The symbol de-mappers 118, 120 can convert signals from the complex signal in a $\mathbb{C}^{Nc}$ domain to soft bits (e.g. log likelihood ratio for each channel bit). Furthermore, output signals from the symbol de-mappers 118, 120 can be received as inputs at rate matching hybrid automatic repeat request (HARQ) combining FEC decoders 122, 124. Rate matching can match the channel bits to the rate expected at the input of the FEC decoder 122, 124. The FEC decoders 122, 124 can also circulate soft information bits for iterative decoding and hard information bits for the final iteration. Additionally, if any HARQ is used the combining of different transmissions can happen at this stage, but the HARQ combining depends on the type of FEC. For example, for polar codes the HARQ combining is different than what it is for Turbo codes.

Figure 2:
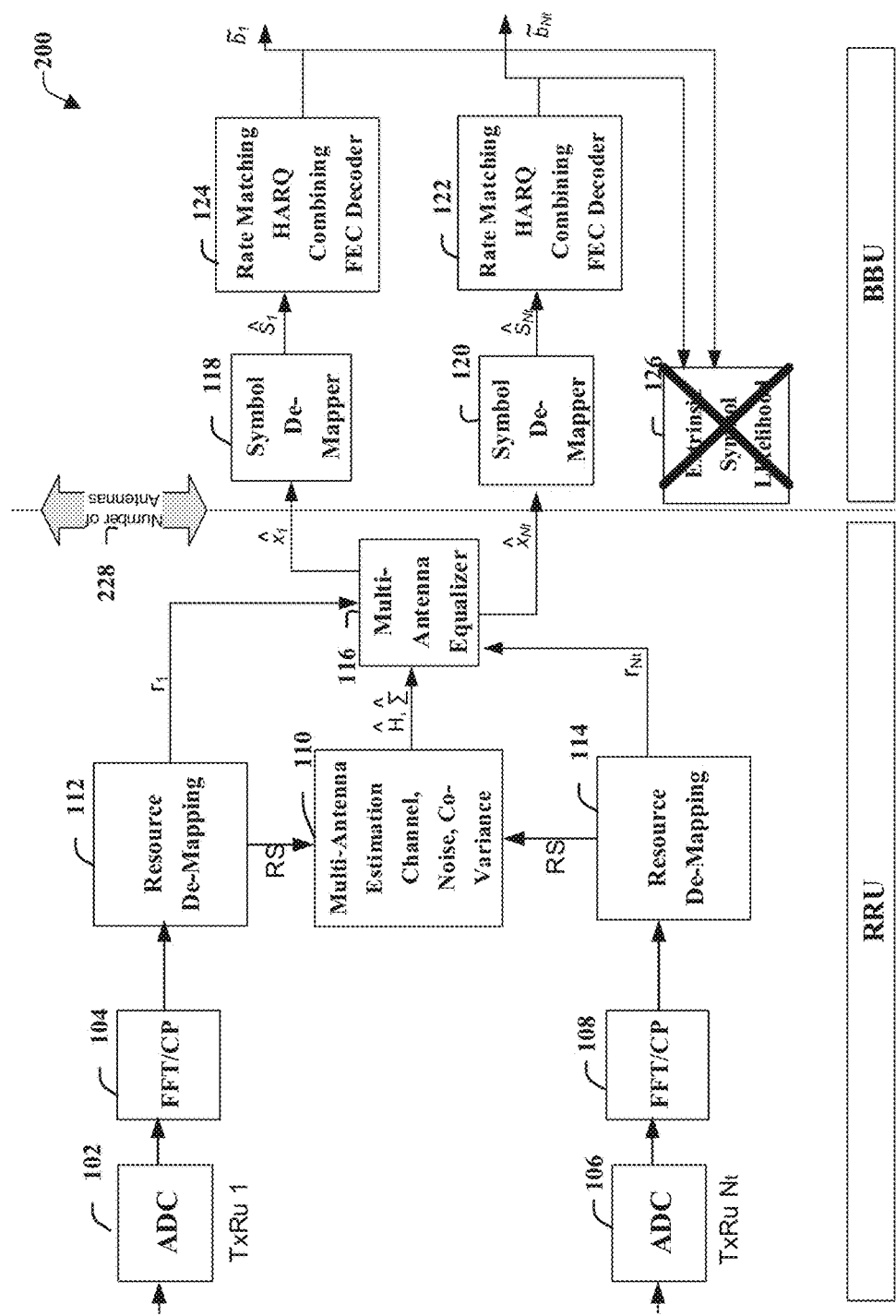
FIG. 2 illustrates an example schematic system block diagram of a split radio access network model according to one or more embodiments.

Referring now to FIG. 2, illustrated is a split radio access network model. To preserve gains from centralization and virtualization a minimum amount of baseband processing can be performed at the RRU and however, enough processing has to be performed to reduce the bandwidth requirement of the fronthaul. As a result, the most C-RAN friendly split RAN architecture for 5G is where the multi-antenna processing is performed at the RRU and the rest of the baseband processing can performed at the RRU. This can reduce the fronthaul bandwidth, which is this case, can scale with the number of spatial layers and not the number of antenna transmission units. In massive MIMO systems the number of spatial layers can be less, typically between 2-4 spatial layers. This is a factor of 16× or 8× less than the number of antennas, which means that the front haul bandwidth can be reduced by the same amount.

One drawback of such a PHY split is that advanced receivers such as SIC (serial interference cancellation) or Turbo equalizers cannot be implemented in the uplink (UL). These advanced receivers can iteratively remove interference from the signal between the multi-antenna equalization and FEC stages. In the split RAN architecture this can comprise sending the signal iteratively between the RRU and BBU several times (between to 4-8 times). Without an advanced receiver implemented, the coverage and capacity of the UL might be restrained.

System 200 can comprise analog to digital conversion components 102, 106, which can convert one or more received analog signals to digital signals prior to sending the converted digital signal(s) to a fast Fourier transform component 104, 108 to convert a time domain signal to frequency domain signal(s) at the RRU.

The RRU can also comprise the resource de-mapping components 112, 114, which can separate various physical channels and reference signals from the time-frequency grid of resource equipment. The multi-antenna estimation component 110 can estimate a MIMO channel response as well as the noise plus interference co-variance needed for equalization de-mapping. The signals can then be passed to a multi-antenna equalizer component 116. The multi-antenna equalizer component 116 can separate the various MIMO layers from the received signal across all the transceivers. This step could be a linear receiver such as minimum mean square error (MMSE)-IRC or a non-linear receiver such as ML. With regards to FIG. 2, the multi-antenna equalizer outputs can be transmitted over a number of physical layers 228 to symbol de-mappers 118, 120 can still convert signals from the complex signal in a $\mathbb{C}^{Nc}$ domain to soft bits (e.g. log likelihood ratio for each channel bit). Furthermore, output signals from the symbol de-mappers 118, 120 can be received as inputs at rate matching HARQ combining FEC decoders 122, 124. Rate matching can match the channel bits to the rate expected at the input of the FEC decoder 122, 124. The FEC decoders 122, 124 can also circulate soft information bits for iterative decoding and hard information bits for the final iteration. Additionally, if any HARQ is used the combining of different transmissions can happen at this stage, but the HARQ combining depends on the type of FEC. For example, for polar codes the HARQ combining is different than what it is for Turbo codes. With regards to the FIG. 2 architecture, the extrinsic symbol likelihood component 126 either does not exist or cannot compute extrinsic values (e.g., for SIC receiver the extrinsic symbol likelihood component 126 can compute the soft symbol or for turbo equalizer the extrinsic symbol likelihood component 126 can computes statistical parameters such as expectation and signal covariance).

Figure 3:
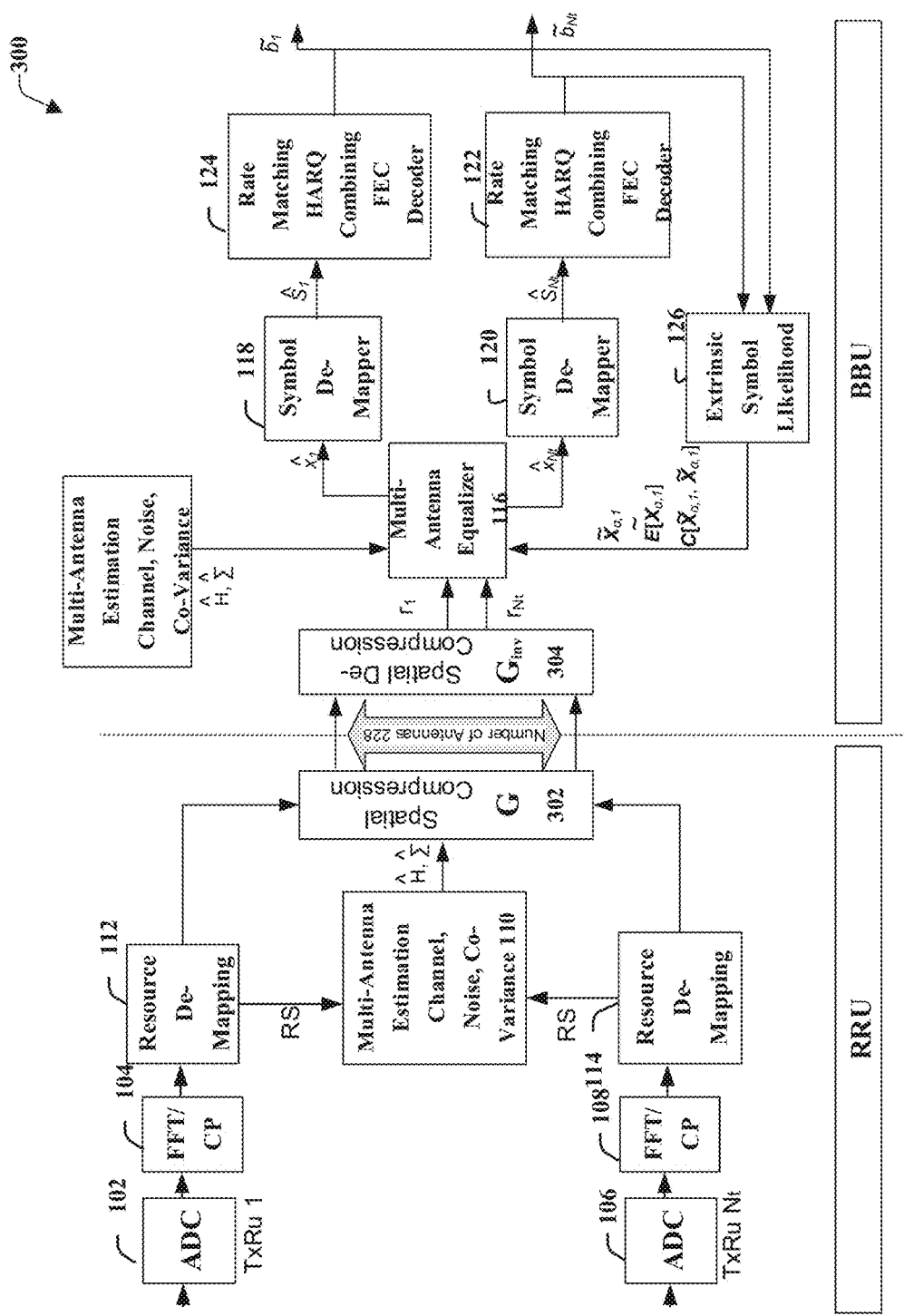
FIG. 3 illustrates an example schematic system block diagram of a centralized radio access network model comprising a spatial compression according to one or more embodiments.

Referring now to FIG. 3, illustrated is a centralized radio access network model comprising a spatial compression. To adjust the fronthaul bandwidth, a split RAN architecture for 5G massive MIMO system can be leveraged. However such a split makes limits the ability to implement iterative advanced receiver techniques at the evolved node B that iterates between the signal equalization and FEC decoder stage. Some examples of such advanced receivers are multi-user serial interference cancellation (MU-SIC), turbo equalizer (e.g., ML turbo equalizer of MMSE turbo equalizer).

A C-RAN architecture that allows for an advanced receiver in the C-RAN architecture can be implemented without having to increase the bandwidth linearly with the number of transmission units. System 300 can comprise analog to digital conversion components 102, 106, which can convert one or more received analog signals to digital signals prior to sending the converted digital signal(s) to a fast Fourier transform component 104, 108 to convert a time domain signal to frequency domain signal(s) at the RRU.

The RRU can also comprise the resource de-mapping components 112, 114, which can separate various physical channels and reference signals from the time-frequency grid of resource equipment. Based on received signals from the resource de-mapping components 112, 114, the multi-antenna estimation component 110 can estimate a MIMO channel response as well as the noise plus interference co-variance needed for equalization de-mapping. The multi-antenna estimation component 110 output signals can then be passed to a spatial compression component 302. The spatial compression component 302 can reduce the number of physical layers 228 that are transported over the RRU to the BBU interface from a number of transceivers to a number of spatial layers. At the BBU, a corresponding spatial decompression component 304 can then recover the number of layers, thereby allowing the BBU to perform channel estimation and equalization with the full number of transceivers. The signals can then be passed to a multi-antenna equalizer component 116. The multi-antenna equalizer component 116 can separate the various MIMO layers from the received signals across all the transceivers. This step could be a linear receiver such as MMSE-IRC or a non-linear receiver such as ML. With regards to FIG. 3, the multi-antenna equalizer component 116 can receive signals from a second multi-antenna estimation component 306. The second multi-antenna estimation can also estimate a MIMO channel response as well as the noise plus interference co-variance needed for equalization de-mapping in accordance with the BBU.

Additionally, the multi-antenna equalizer component 116 output can be transmitted to symbol de-mappers 118, 120 that can convert signals from the complex signal in a $\mathbb{C}^{Nc}$ domain to soft bits (e.g. log likelihood ratio for each channel bit). Furthermore, output signals from the symbol de-mappers 118, 120 can be received as inputs at rate matching HARQ combining FEC decoders 122, 124. Rate matching can match the channel bits to the rate expected at the input of the FEC decoder 122, 124. The FEC decoders 122, 124 can also circulate soft information bits for iterative decoding and hard information bits for the final iteration. Additionally, if any HARQ is used the combining of different transmissions can happen at this stage, but the HARQ combining depends on the type of FEC. For example, for polar codes the HARQ combining is different than what it is for turbo codes. With regards to the FIG. 3 architecture, the extrinsic symbol likelihood component 126 can receive output signals from the FEC decoders 122, 124 and can compute extrinsic values (e.g. for SIC receiver the extrinsic symbol likelihood component 126 can compute the soft symbol or for turbo equalizer the extrinsic symbol likelihood component 126 can computes statistical parameters such as expectation and signal covariance). The extrinsic values can then be output to the multi-antenna equalizer component 116 to process.

Figure 4:
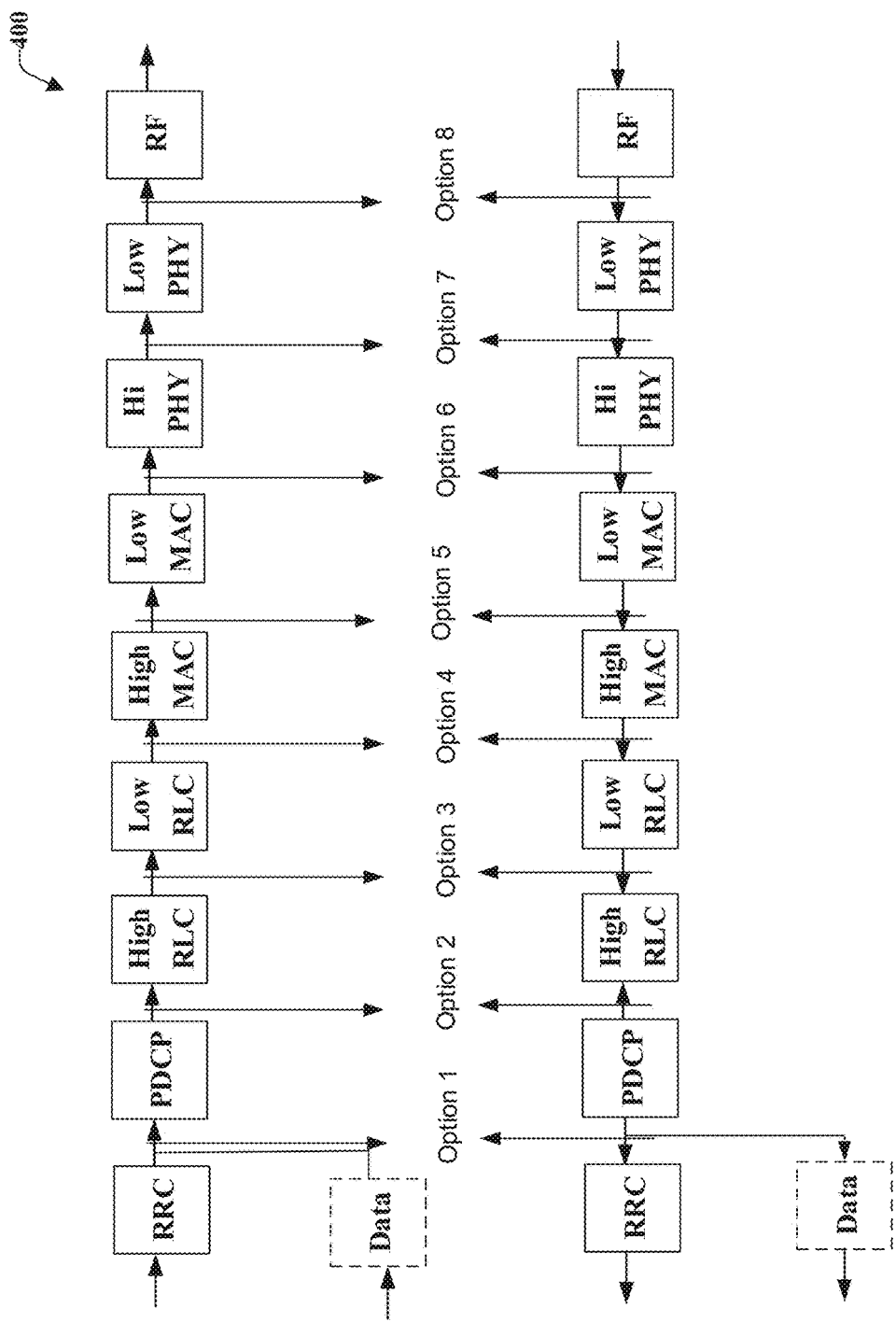
FIG. 4 illustrates an example schematic system block diagram of a general overview of possible radio access network protocol split options according to one or more embodiments.

Referring now to FIG. 4, illustrated is a general overview of possible radio access network protocol split options. Protocol layers 400 that reside at the centralized unit can be virtualized in a pooled architecture, thereby enabling benefits related to a software defined network (SDN) and/or network function virtualization (NFV) based network architecture. Consequently, it can be beneficial to split the protocol layers 400 as low in the protocol stack as possible.

Figure 5:
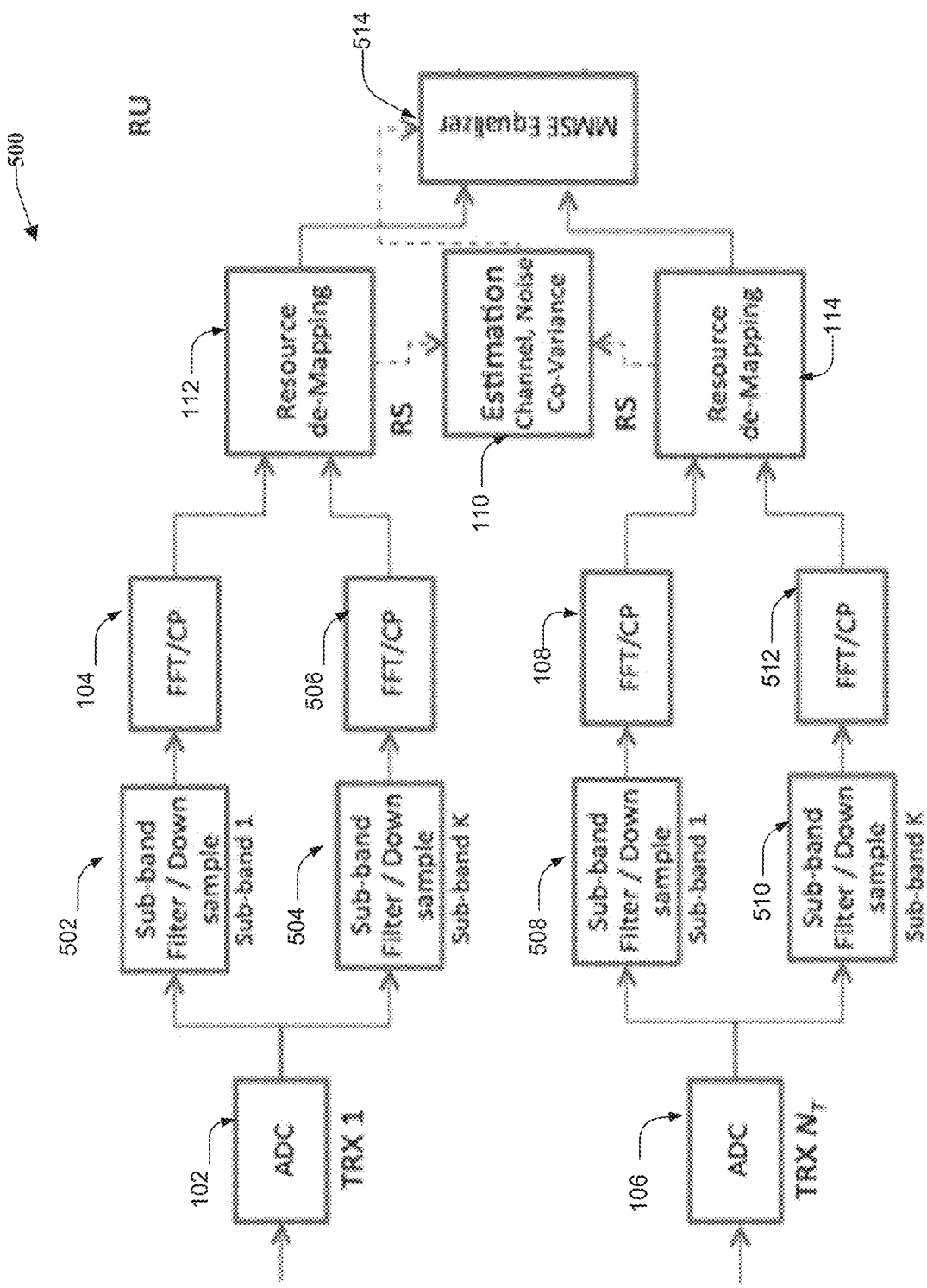
FIG. 5 illustrates an example schematic system block diagram of a remote unit side of a generalized view of physical level functions with physical split according to one or more embodiments.
Figure 6:
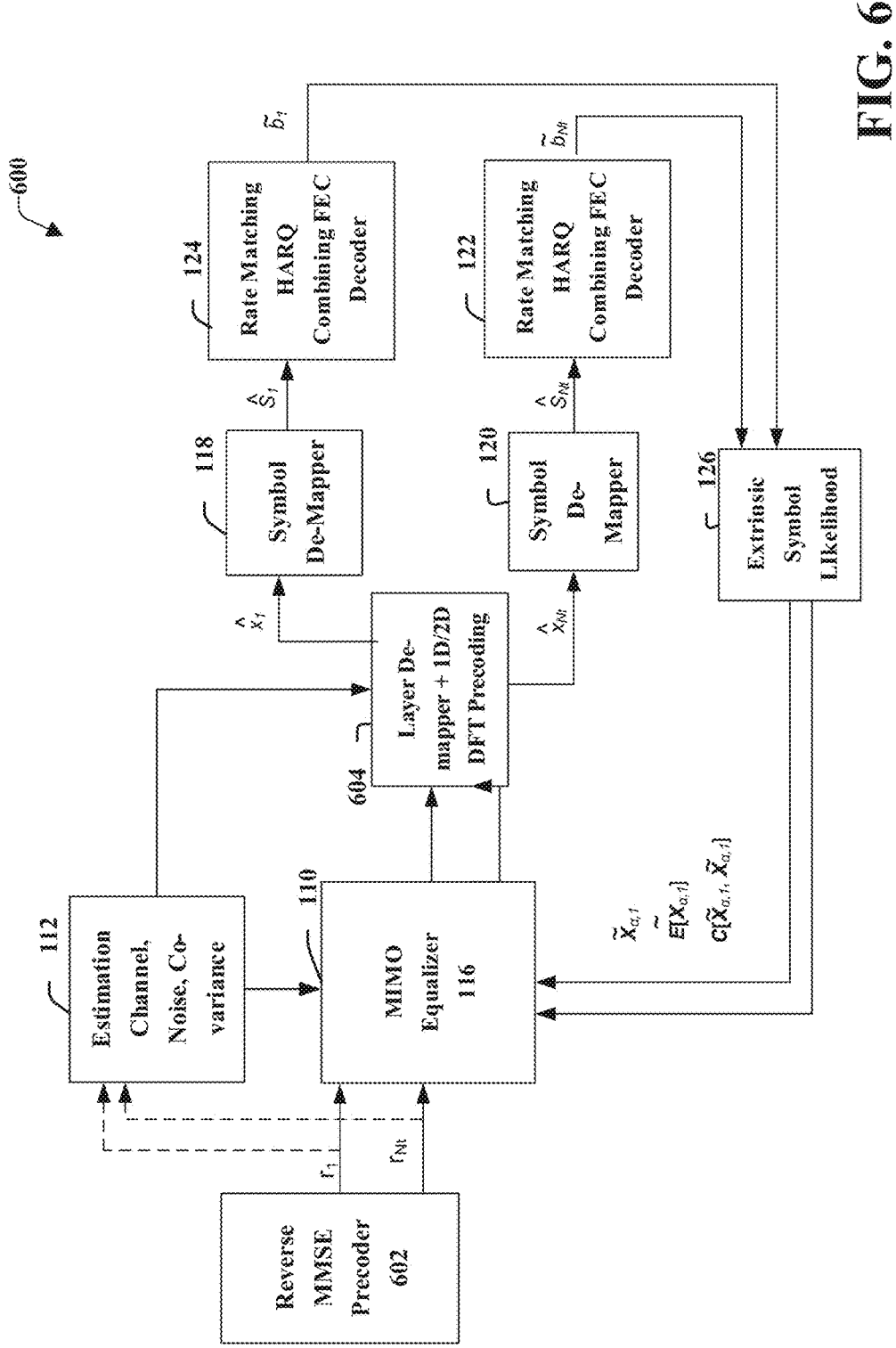
FIG. 6 illustrates an example schematic system block diagram of a centralized unit side of a generalized view of physical level functions with physical split according to one or more embodiments.

Referring now to FIGS. 5 and 6, illustrated is a remote unit side and a centralized unit side of a generalized view of physical level functions with a physical split. FIGS. 5 and 6 illustrate an example advanced iterative receiver for the uplink with a PHY split using a linear compression technique capable of satisfying the aforementioned requirements for the uplink. A linear spatial compression technique can reduce the number of PHY layers that are transported over the RU-CU interface from a number of transceivers to a number of spatial layer. System 500 can comprise analog to digital conversion components 102, 106, which can convert one or more received analog signals to digital signals prior to sending the converted digital signal(s) to sub-band filter components 502, 504, 508, 510. The sub-band filter components 502, 504, 508, 510 can then send the signals to fast Fourier transform components 104, 108, 506, 512 to convert a time domain signal to frequency domain signal(s) at the RRU. The RRU can also comprise the resource de-mapping components 112, 114, which can separate various physical channels and reference signals from the time-frequency grid of resource equipment. Based on received signals from the resource de-mapping components 112, 114, the multi-antenna estimation component 110 can estimate a MIMO channel response as well as the noise plus interference co-variance needed for equalization de-mapping. The multi-antenna estimation component 110 output signals can then be passed to an MIVISE Equalizer component 512. The MMSE Equalizer component 512 can reduce the number of PHY layers that are transported over the RRU to the CU interface from a number of transceivers to a number of spatial layers.

At the CU at system 600, a corresponding reverse MMSE pre-coder component 602 can then recover the number of transmission layers, thereby allowing the CU to perform channel estimation and equalization with the full number of transmission dimensions. It is possible that there can be some degradation in performance as the compression decompression stage can introduce some errors, however the reduction in bandwidth, due to this approach, is likely to outweigh any degradation. Moreover, this approach may make it feasible to achieve a good PHY split option that satisfies all three aforementioned scenarios. Specifically, the linear compression technique proposed in this with regards to FIGS. 5 and 6 is shown as two new components. The minimum mean square error (MMSE) equalizer component 514 can reduce the signal dimension to number of spatial layers and transmit signal dimension data to the reverse MMSE pre-coder component 602 to augment the signal dimension back to the number of spatial layers up to the full dimension corresponding to the number of transceivers. The RU, which performs the MMSE equalization, can pass in MMSE filter weights to the CU, which can then generate the reverse MMSE pre-coder, which can be the inverse of an MMSE equalizer matrix. There can also be two channel estimation blocks, one in the RU to aid the MMSE equalization and another in the CU to perform MIMO equalization.

The reverse MMSE pre-coder component 602 can pass signals to a multi-antenna equalizer component 116. The multi-antenna equalizer component 116 can separate the various MIMO layers from the received signals across all the transceivers. This step could be a linear receiver such as MMSE-IRC or a non-linear receiver such as ML. The multi-antenna equalizer component 116 can receive signals from a second multi-antenna estimation component 306. The second multi-antenna estimation can also estimate a MIMO channel response as well as the noise plus interference co-variance needed for equalization de-mapping in accordance with the BBU. Furthermore, the multi-antenna equalizer component 116 can send output signals to a layer de-mapper (1D/2D DFT pre-coding) component 604. In case of non-orthogonal frequency division multiplexed (OFDM) based waveforms, this step can be used to transform the signal back to the signal processing domain (e.g., time domain for signal carrier frequency division multiple access (SC-FDMA)) or delay-doppler domain for one time frame (OTFS). Signal outputs from the layer de-mapper (1D/2D DFT pre-coding) component 604 can be received by to symbol de-mappers 118, 120 that can convert signals from the complex signal in a $\mathbb{C}^{Nc}$ domain to soft bits (e.g. log likelihood ratio for each channel bit). Furthermore, output signals from the symbol de-mappers 118, 120 can be received as inputs at rate matching HARQ combining FEC decoders 122, 124. Rate matching can match the channel bits to the rate expected at the input of the FEC decoder 122, 124. The FEC decoders 122, 124 can also circulate soft information bits for iterative decoding and hard information bits for the final iteration. Additionally, if any HARQ is used the combining of different transmissions can happen at this stage, but the HARQ combining depends on the type of FEC. For example, for polar codes the HARQ combining is different than what it is for Turbo codes. With regards to the FIG. 6 architecture, the extrinsic symbol likelihood component 126 can receive output signals from the FEC decoders 122, 124 and can compute extrinsic values (e.g. for SIC receiver the extrinsic symbol likelihood component 126 can compute the soft symbol or for turbo equalizer the extrinsic symbol likelihood component 126 can computes statistical parameters such as expectation and signal covariance). The extrinsic values can then be output to the multi-antenna equalizer component 116 to process.

Figure 7:
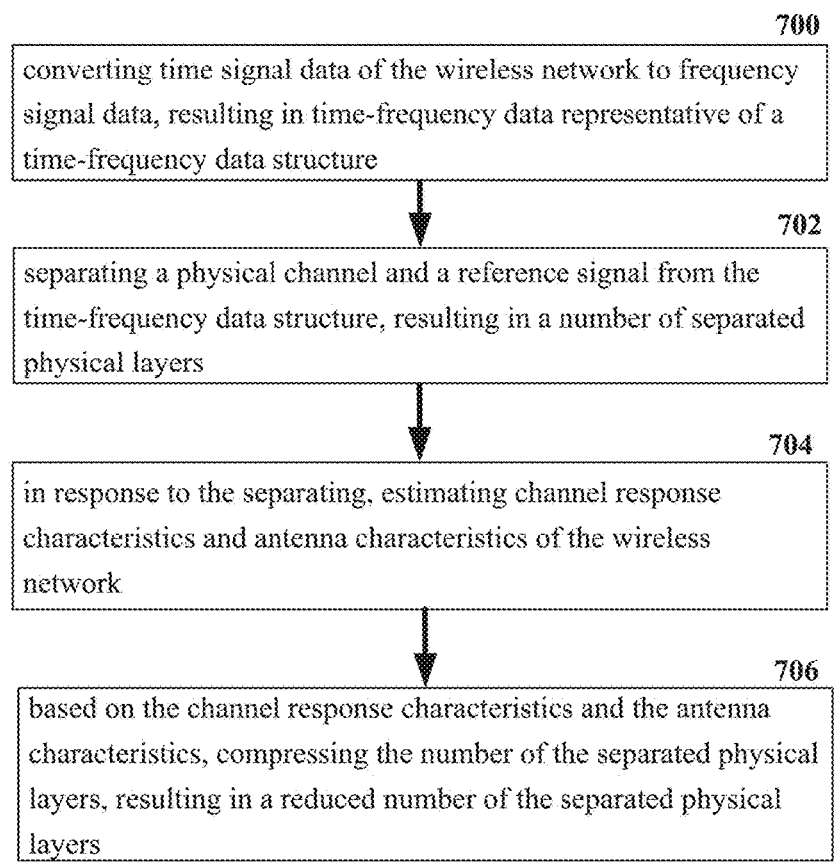
FIG. 7 illustrates an example flow diagram for compressing physical layers of a radio access network according to one or more embodiments.

Referring now to FIG. 7, illustrated is a flow diagram for compressing physical layers of a radio access network. At element 700, a method can comprise converting (e.g., via a fast Fourier transform component 104) time signal data of the wireless network to frequency signal data, resulting in time-frequency data representative of a time-frequency data structure. At element 702, the method can comprise separating (e.g., via resource de-mapping components 112) a physical channel and a reference signal from the time-frequency data structure, resulting in a number of separated physical layers. In response to the separating, estimating (e.g., via a multi-antenna estimation component 110) channel response characteristics and antenna characteristics of the wireless network at element 704. Additionally, based on the channel response characteristics and the antenna characteristics, compressing (e.g., via a spatial compression component 302) the number of the separated physical layers at element 706, resulting in a reduced number of the separated physical layers.

Figure 8:
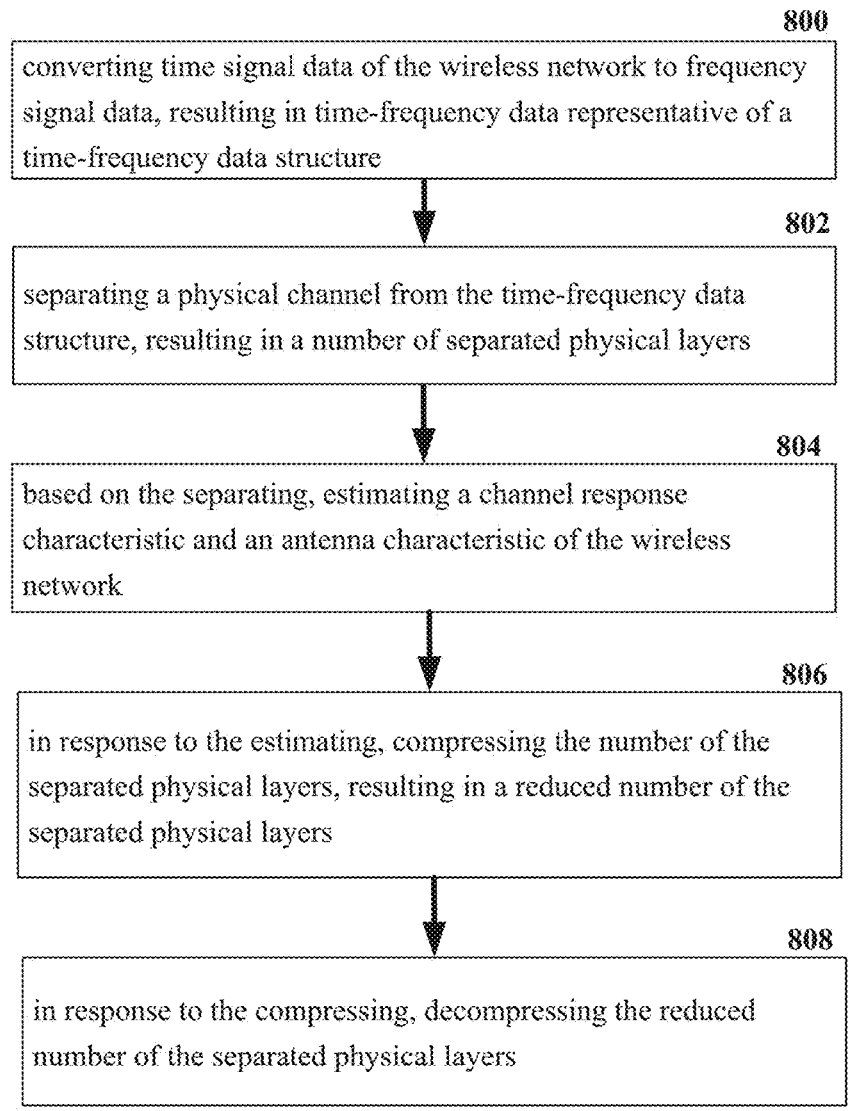
FIG. 8 illustrates an example flow diagram for compressing and decompressing physical layers of a radio access network according to one or more embodiments.

Referring now to FIG. 8, illustrated is a flow diagram for compressing and decompressing physical layers of a radio access network. At element 800, a system can convert time signal data of the wireless network to frequency signal data (e.g., via a fast Fourier transform component 104), resulting in time-frequency data representative of a time-frequency data structure. At element 802, the system can separate a physical channel from the time-frequency data structure (e.g., via resource de-mapping components 112), resulting in a number of separated physical layers. Based on the separating, the system can estimate a channel response characteristic and an antenna characteristic of the wireless network at element 804 (e.g., via a multi-antenna estimation component 110). In response to the estimating, the system can compress the number of the separated physical layers (e.g., via a spatial compression component 302), resulting in a reduced number of the separated physical layers at element 806, and in response to the compressing, the system can decompress the reduced number of the separated physical layers (e.g., via a spatial decompression component 304).

Figure 9:
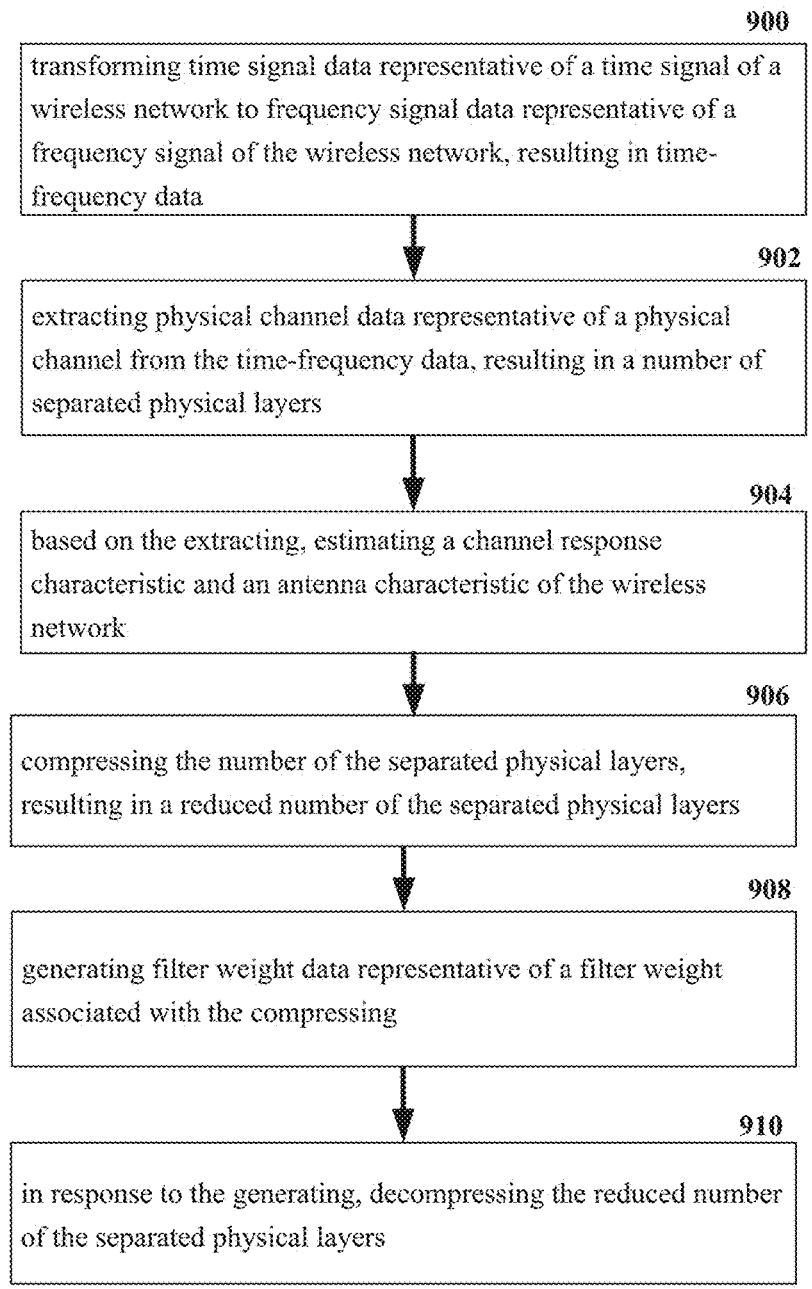
FIG. 9 illustrates an example flow diagram for compressing and decompressing physical layers of a radio access network based on a filter weight according to one or more embodiments.

Referring now to FIG. 9, illustrated is a flow diagram for compressing and decompressing physical layers of a radio access network based on a filter weight. At element 900 the machine-readable medium can transform time signal data representative of a time signal of a wireless network to frequency signal data representative of a frequency signal of the wireless network (e.g., via a fast Fourier transform component 104), resulting in time-frequency data, and extract physical channel data representative of a physical channel from the time-frequency data (e.g., via resource de-mapping components 112), resulting in a number of separated physical layers at element 902. Based on the extracting, estimating a channel response characteristic and an antenna characteristic of the wireless network at element 904 (e.g., via a multi-antenna estimation component 110). At element 906, the machine-readable medium can compress the number of the separated physical layers (e.g., via a spatial compression component 302), resulting in a reduced number of the separated physical layers. Additionally, the machine-readable medium can generate filter weight data representative of a filter weight associated with the compressing at element 908 (e.g., via a spatial compression component 302). Furthermore, in response to the generating, the machine readable medium can decompress the reduced number of the separated physical layers at element 910 (e.g., via a spatial decompression component 304).

Figure 10:
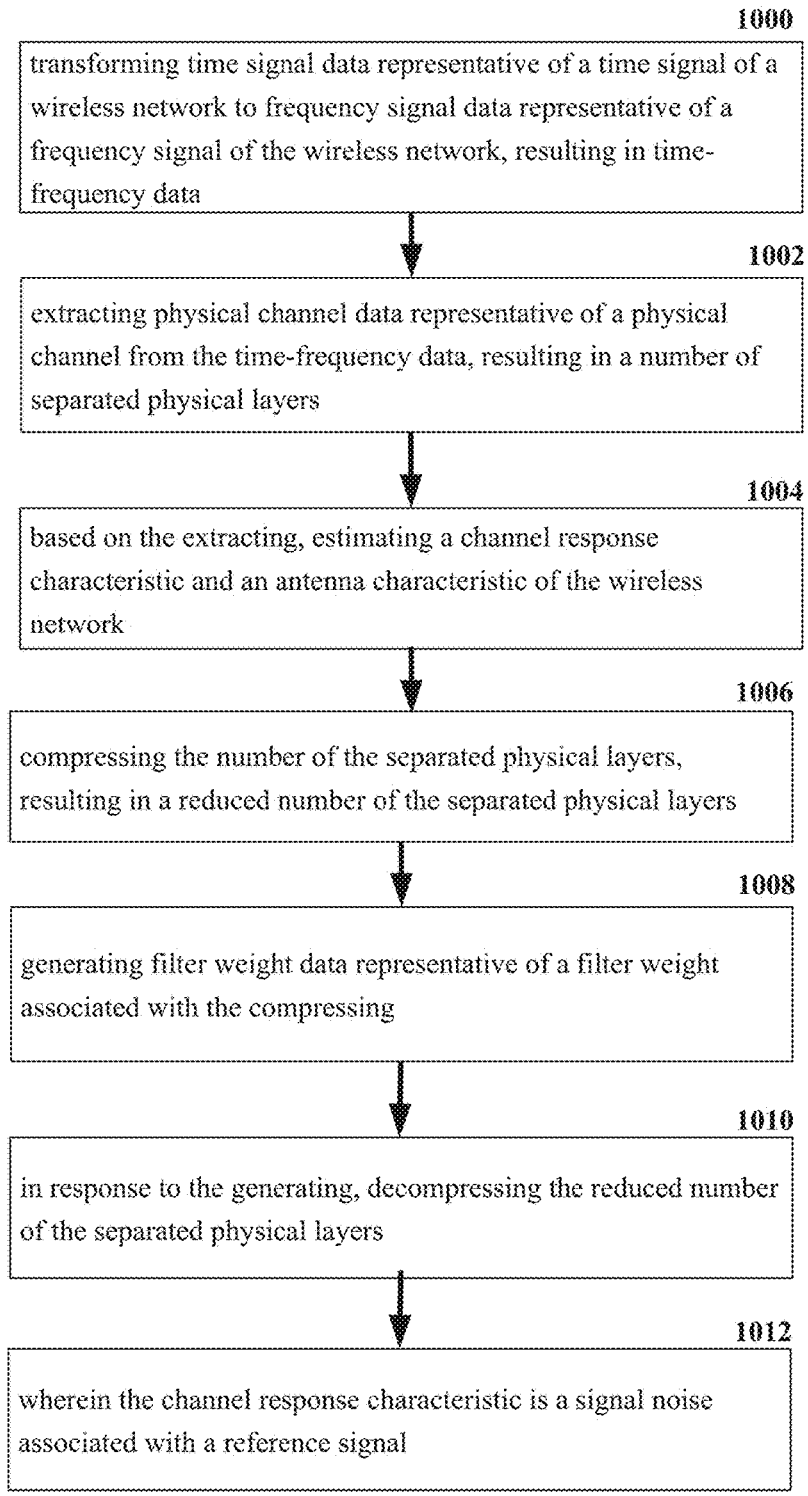
FIG. 10 illustrates an example flow diagram for compressing and decompressing physical layers of a radio access network based on a filter weight and a signal noise according to one or more embodiments.

Referring now to FIG. 10, illustrated is a flow diagram for compressing and decompressing physical layers of a radio access network based on a filter weight and a signal noise. At element 1000 the machine-readable medium can transform time signal data representative of a time signal of a wireless network to frequency signal data representative of a frequency signal of the wireless network (e.g., via a fast Fourier transform component 104), resulting in time-frequency data, and extract physical channel data representative of a physical channel from the time-frequency data (e.g., via resource de-mapping components 112), resulting in a number of separated physical layers at element 1002. Based on the extracting, estimating a channel response characteristic and an antenna characteristic of the wireless network at element 1004 (e.g., via a multi-antenna estimation component 110). At element 1006, the machine-readable medium can compress the number of the separated physical layers, resulting in a reduced number of the separated physical layers (e.g., via a spatial compression component 302). Additionally, the machine-readable medium can generate filter weight data representative of a filter weight associated with the compressing at element 1008 (e.g., via a spatial compression component 302). Furthermore, in response to the generating, the machine readable medium can decompress the reduced number of the separated physical layers at element 1010 (e.g., via a spatial decompression component 304), wherein the channel response characteristic is a signal noise associated with a reference signal at element 1012.

Figure 11:
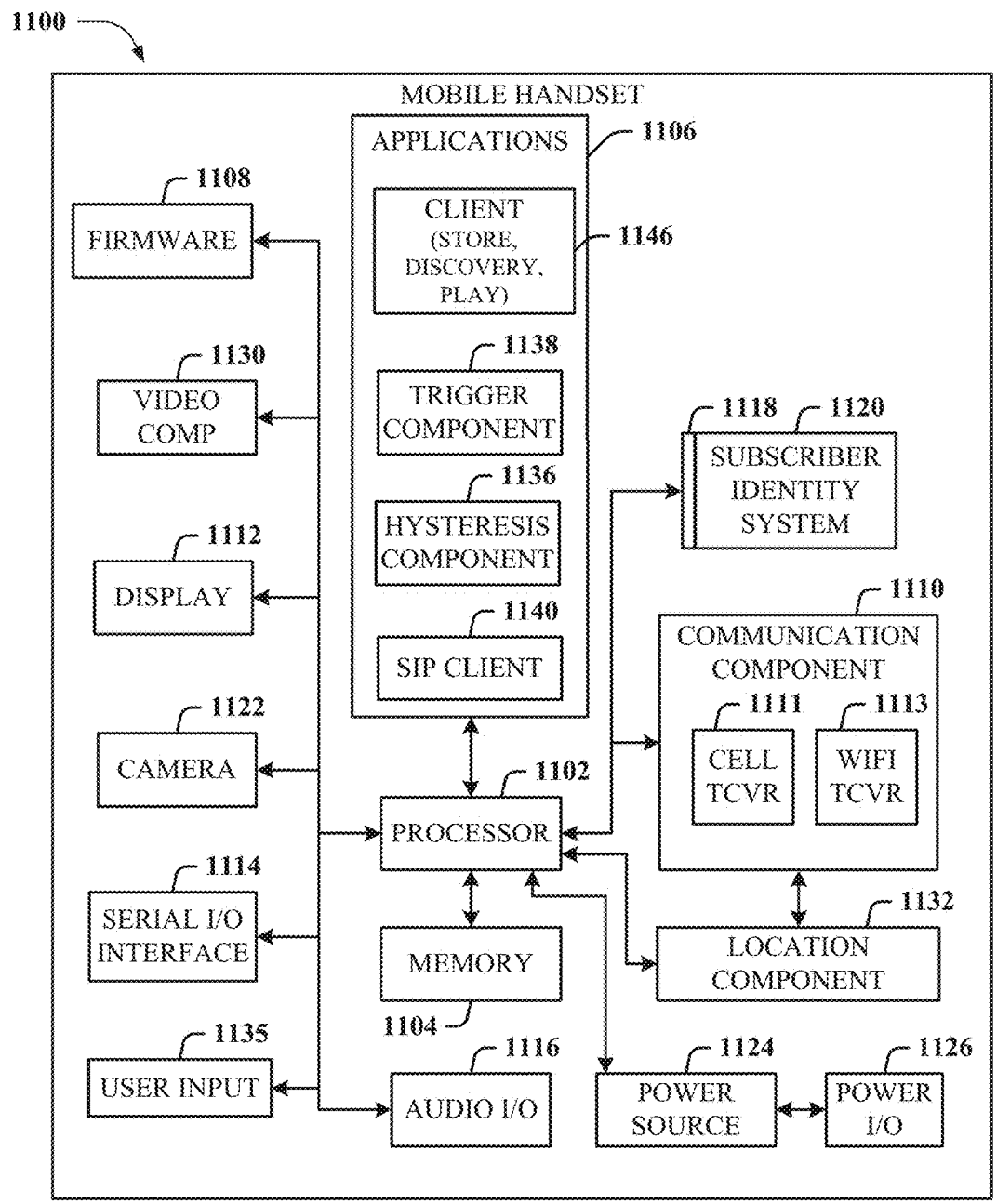
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
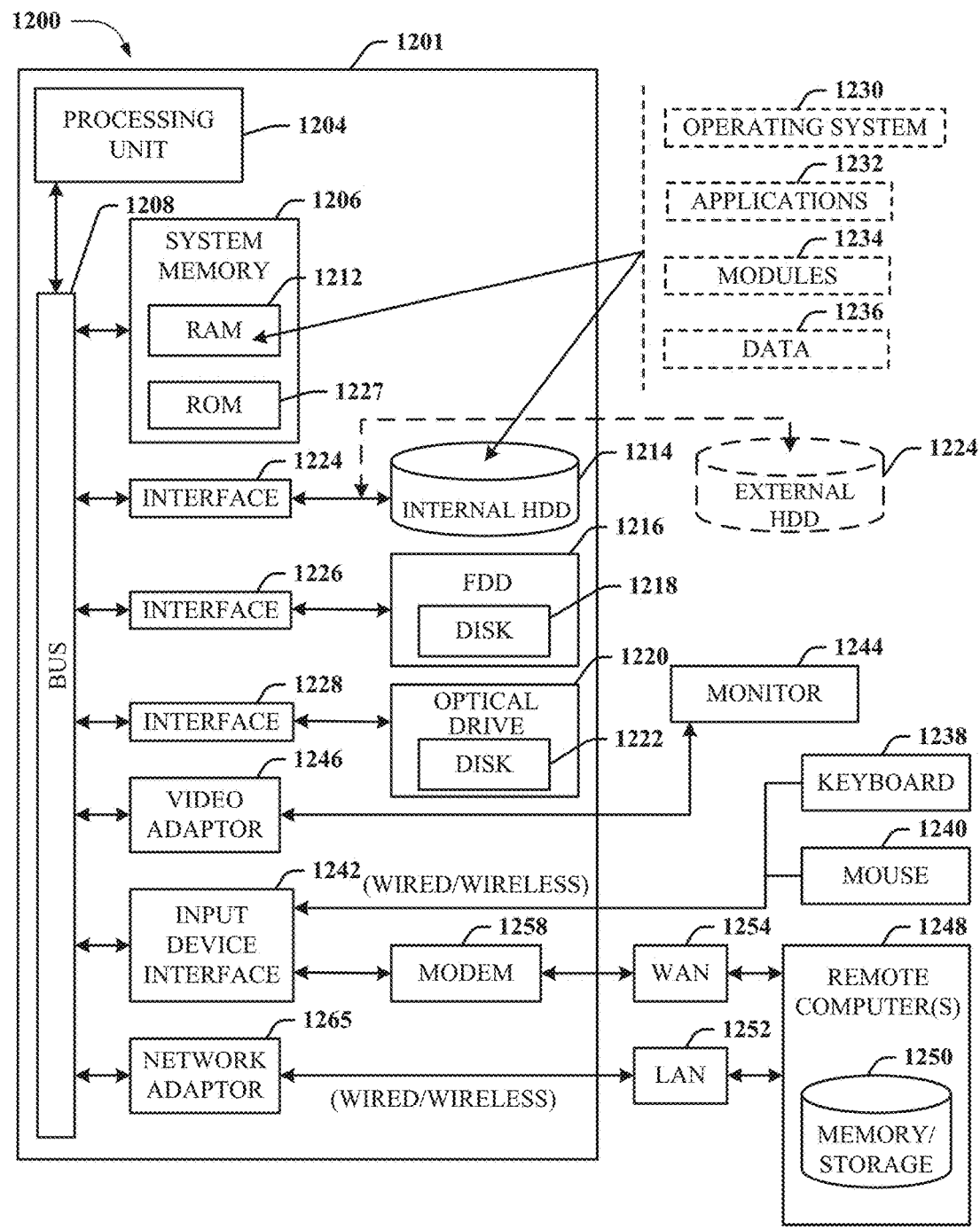
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party.

While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Traditional C-RAN architecture can require the amount of bandwidth needed to connect the centralized baseband unit (BBU) and the remote radio unit (RRU) to increase linearly with number of antenna ports and the system bandwidth. For example, from a 20 MHz LTE carrier with 2Tx antenna to a 100 MHz 5G carrier with 32TxRU, the bandwidth requirement of the fronthaul goes up by a factor of 5×16=80.

One of the major drawbacks of such a PHY split is that advanced receivers such as SIC (serial interference cancellation) or Turbo equalizers cannot be implemented in the uplink (UL). These advanced receivers iteratively wash the signal between the multi-antenna equalization and FEC stages. In the split RAN architecture this would imply sending the signal iteratively between the RRU and BBU several times (up to 4-8 times). Not being able to implement an advanced receiver could severely hamper the coverage and capacity of the UL, which is of significant concern given that 5G systems can be deployed in higher frequency bands compared to LTE where the propagation is worse to begin with. Traditionally CIPRI uses 15+15 bits to represent the I and Q branches of the received signal. However with this spatial compression/decompression technique, as small as 5+5 bits can be used where the decompression stage can clean quantization noise. Consequently, from the reduction in the number of streams, an additional 3× reduction can be achieved in the fronthaul bandwidth due to the noise tolerance of the decompression stage.

Therefore, the traditional C-RAN architecture with all baseband processing centralized is not feasible for 5G. As a result, a split RAN architecture where some of the baseband processing can be moved to the RRU can mitigate this issue. However in order to preserve most of the gains from centralization and virtualization the minimum amount of baseband processing should be placed at the radio resource unit (RRU) and yet reduce the bandwidth requirement of the fronthaul. As a result, the most C-RAN friendly split RAN architecture for 5G is where all of the multi-antenna processing is performed at the RRU and the rest of the baseband processing is performed at the RRU. This reduces the fronthaul bandwidth, which, in this case, scales with the number of spatial layers and not the number of antennas (TxRU). In massive MIMO systems the number of spatial layers is much less, typically around 2-4. This is a factor of 16× or 8× less than the number of antennas, which means that the front haul bandwidth is reduced by the same amount.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
converting, by a first wireless network device comprising a processor and of a wireless network, time signal data of the wireless network to frequency signal data, resulting in a time-frequency data structure representative of time-frequency data;
separating, by the first wireless network device, a physical channel and a reference signal from the time-frequency data structure, resulting in a number of separated physical layers;
in response to the separating, estimating, by the first wireless network device, channel response characteristics and antenna characteristics of wireless network devices of the wireless network;
based on the channel response characteristics and the antenna characteristics, compressing, by the first wireless network device, the number of the separated physical layers, resulting in a reduced number of the separated physical layers smaller than the number; and
in response to the compressing,
facilitating, by the first wireless network device, processing a complex output signal to determine a ratio associated with a channel bit associated with a second wireless network device, and
facilitating, by the first wireless network device, matching the channel bit to an expected rate for data to be received by the second wireless network device to reduce a number of data streams to be transported from the first wireless network device to the second wireless network device.

2. The method of claim 1, further comprising:
decompressing, by the first wireless network device, the reduced number of separated physical layers to the number of separated physical layers.

3. The method of claim 2, wherein the wireless network devices comprise the first wireless network device, wherein the number is a first number, and wherein the decompressing comprises decompressing the reduced number in accordance with a second number of transceivers.

4. The method of claim 2, wherein the channel response characteristics comprise signal noise associated with the reference signal.

5. The method of claim 2, wherein the channel response characteristics comprise an interference co-variance associated with the reference signal.

6. The method of claim 2, wherein the separating comprises separating by a linear receiver.

7. The method of claim 2, wherein the separating comprises separating by a non-linear receiver.

8. A system, comprising:
a processor; and
a memory that stores executable instructions that, when executed by the processor, facilitate performance of operations, comprising:
converting time signal data of a first wireless network device of a wireless network to frequency signal data, resulting in time-frequency data representative of a time-frequency data structure;
separating a physical channel from the time-frequency data structure, resulting in a number of separated physical layers;
based on the separating, estimating a channel response characteristic and an antenna characteristic of the first wireless network device of the wireless network;
in response to the estimating, compressing the number of the separated physical layers, resulting in a reduced number of the separated physical layers that is less than the number;
in response to the compressing, decompressing the reduced number of the separated physical layers;
converting a complex signal to a ratio associated with a channel bit of a second wireless network device of the wireless network, and
matching the channel bit to an expected rate to be received as an input to the second wireless network device to reduce a number of data streams from a first number to a second number to be transported from the first wireless network device to the second wireless network device.

9. The system of claim 8, wherein the decompressing results in a recovery of the number of separated physical layers.

10. The system of claim 9, wherein the operations further comprise:
initiating a channel estimation associated with the estimating the channel response characteristic.

11. The system of claim 10, wherein the operations further comprise:
in response to the initiating, facilitating a channel equalization associated with the channel estimation.

12. The system of claim 8, wherein the decompressing results in a bandwidth reduction.

13. The system of claim 8, wherein the decompressing corresponds to a number of transceivers.

14. The system of claim 9, wherein the operations further comprise:
sending, from a radio unit device to a baseband unit device, filter weight data representative of a compression filter.

15. A non-transitory machine-readable storage medium, comprising executable instructions that, when executed by a processor, facilitate performance of operations, comprising:
transforming time signal data representative of a time signal of a first network device of a wireless network to frequency signal data representative of a frequency signal of the first network device of the wireless network, resulting in time-frequency data;
extracting physical channel data representative of a physical channel from the time-frequency data, resulting in a number of separated physical layers;
based on the extracting, estimating a channel response characteristic and an antenna characteristic of the first network device of the wireless network;
compressing the number of the separated physical layers, resulting in a reduced number of the separated physical layers less than the number;
based on the reduced number of the separated physical layers, facilitating converting a complex signal to a ratio associated with a channel bit at a second network device of the wireless network;
based on the reduced number of the separated physical layers, facilitating matching the channel bit to an expected rate to be received as an input to the second network device to reduce a number of data streams to be transported from the first network device to the second network device;
generating filter weight data representative of a filter weight associated with the compressing; and in response to the generating, decompressing the reduced number of the separated physical layers to the number of the separated physical layers.

16. The non-transitory machine-readable storage medium of claim 15, wherein the channel response characteristic is a signal noise associated with a reference signal.

17. The non-transitory machine-readable storage medium of claim 15, wherein the channel response characteristic is an interference co-variance associated with a reference signal.

18. The non-transitory machine-readable storage medium of claim 15, wherein the filter weight data is received from a radio unit device.

19. The non-transitory machine-readable storage medium of claim 18, wherein the filter weight data is transmitted to a baseband unit device.

20. The non-transitory machine-readable storage medium of claim 19, wherein the decompressing is based on a number of transceivers associated with the baseband unit device.

* * * * *